UNITED STATES PATENT OFFICE.

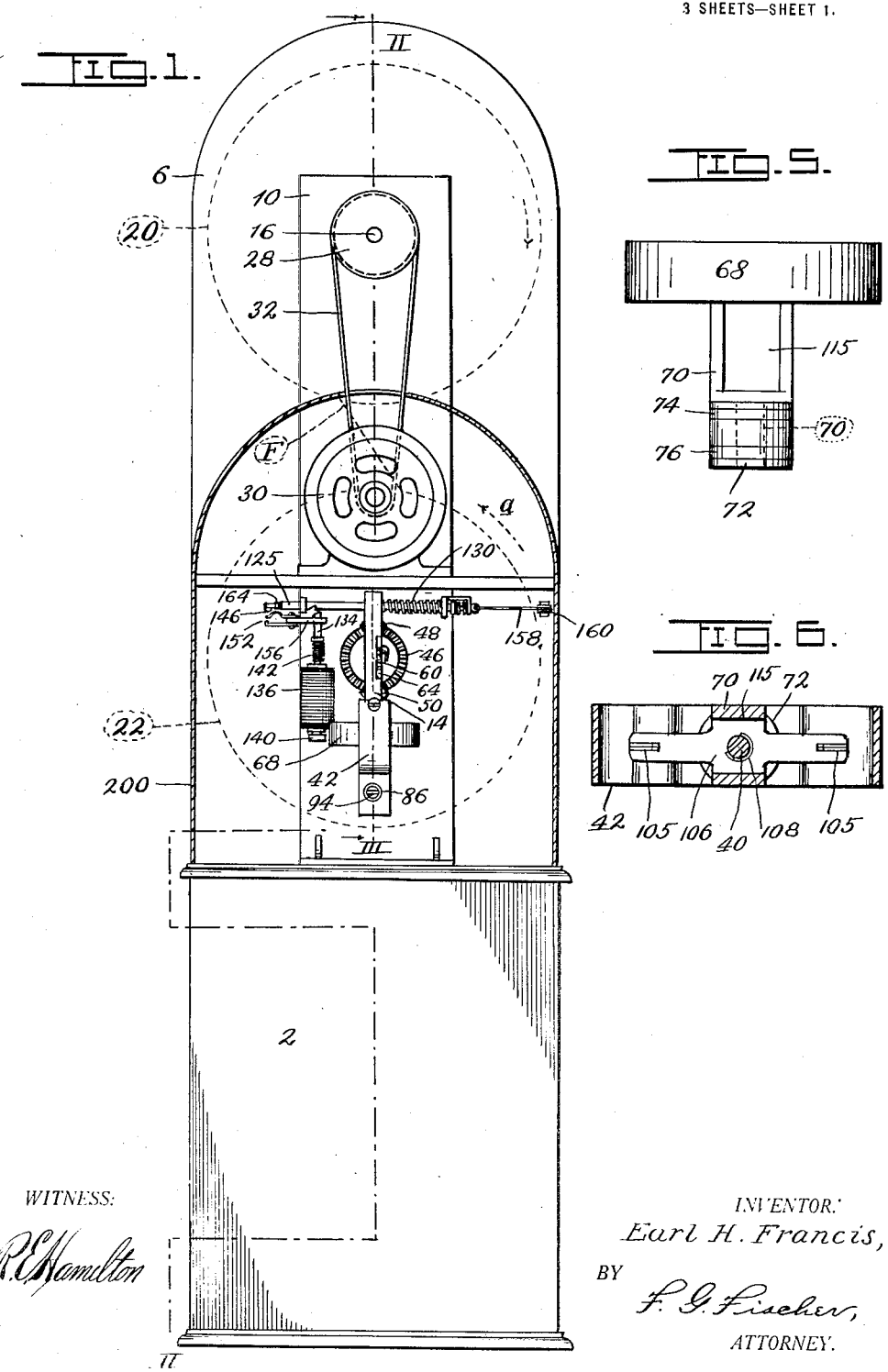

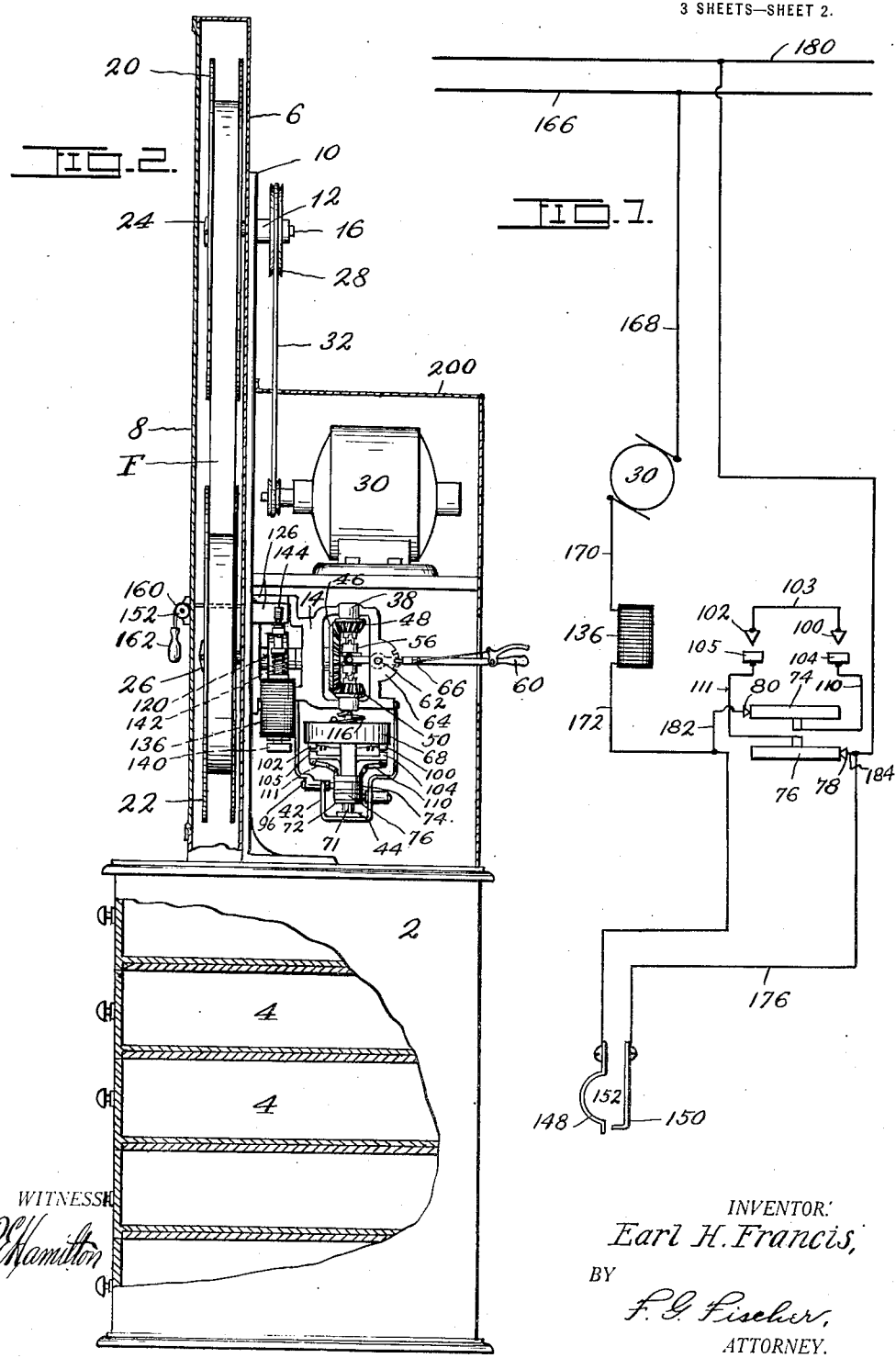

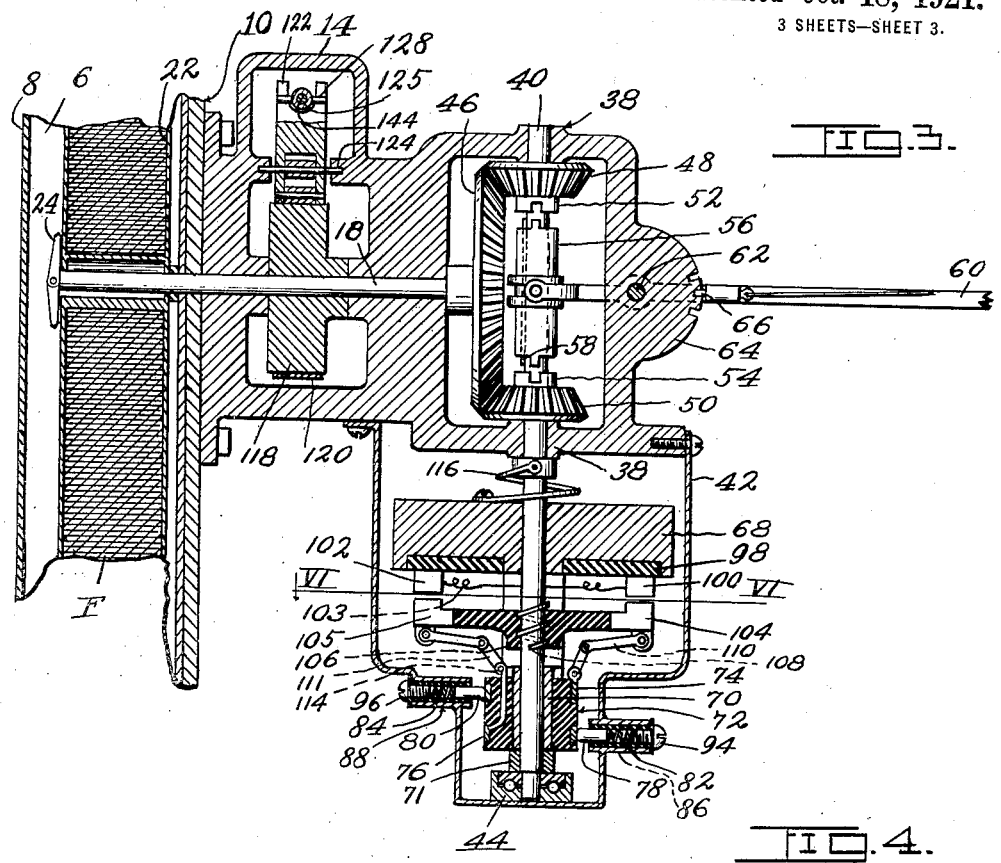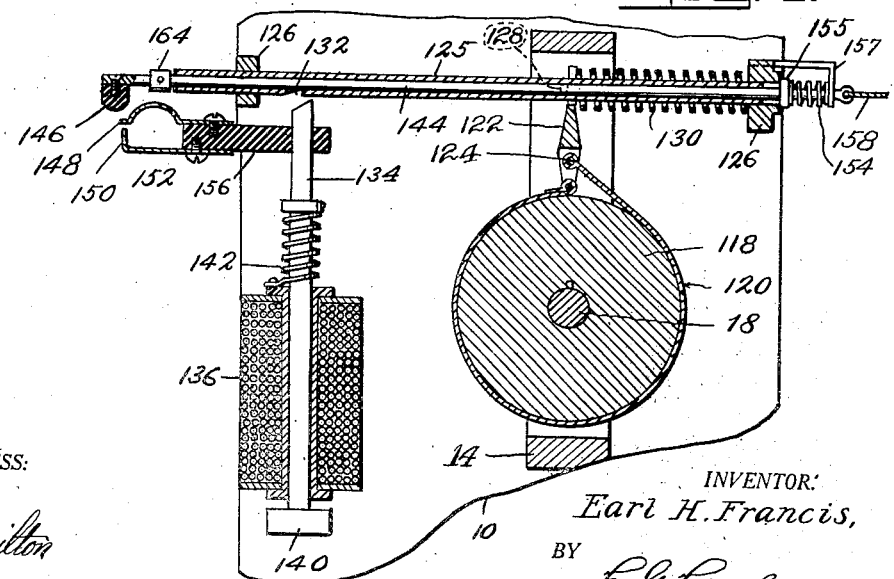

EARL H. FRANCIS, OF MOUNT WASHINGTON, MISSOURI.

FILM-WINDING APPARATUS.

1,394,077.     Specification of Letters Patent.     Patented Oct. 18, 1921.

Application filed December 27, 1919. Serial No. 347,685.

*To all whom it may concern:*

Be it known that I, EARL H. FRANCIS, a citizen of the United States, residing at Mount Washington, in the county of Jackson and State of Missouri, have invented certain new and useful Improvements in Film-Winding Apparatus, of which the following is a specification.

This invention relates to apparatus for winding films upon reels and is designed to afford efficient and automatically governed means for rewinding exhibited motion picture films to put them in condition for subsequent exhibition through a picture projecting apparatus. After the film has been run through a picture projecting apparatus, the reel on which the film has been wound is removed and said film is rewound upon another reel, so that the pictures on the film may succeed each other in proper order when again exhibited. In moving picture shows where a film is exhibited a number of times at relatively short intervals it is necessary that it be expeditiously rewound or reversed in direction, in order to permit the operator to attend both to the film winding apparatus and the picture projection machine without delays between successive exhibitions.

It is therefore the main object of this invention to provide a film winding or reversing apparatus, which after having been started, is automatic in its operation so as not to require the attention of the operator while rewinding of the film is taking place.

The invention in the present apparatus involves a driving shaft which is adapted to receive and rotate a reel upon which the film is to be wound, a driven shaft to receive a reel from which the film is to be transferred to the driving reel, an electric motor for actuating the driving shaft, means to initially close said motor circuit, and automatic means to maintain the motor circuit in closed position during the film winding operation, and then automatically open said circuit on the completion of said winding operation. The foregoing combination embodies, generally, the present features of my invention, the scope of such invention being more particularly pointed out in the claims.

In order that the invention may be fully understood, reference will now be had to the accompanying drawings, in which:

Figure 1 is a rear elevation, partly in section, of the invention.

Fig. 2 is an irregular vertical section on line II—II of Fig. 1.

Fig. 3 is an enlarged fragmentary vertical section on line III—III of Fig. 1.

Fig. 4 is an enlarged fragmentary section of a brake mechanism and associated parts.

Fig. 5 is a detail side elevation of a governor and associated parts.

Fig. 6 is a horizontal section on line VI—VI of Fig. 3.

Fig. 7 is a diagram of an electric circuit employed in carrying out the invention.

In carrying out the invention, I employ a cabinet 2 provided with a series of drawers 4 for holding reels. The upper portion of the cabinet 2 is surmounted by a magazine 6, to the interior of which access is had through a door 8. The rear side of the magazine 6 is reinforced and sustained by a bracket 10 secured at its lower end to the cabinet 2. The bracket 10 is provided with a bearing 12 and a frame 14 in which driving and driven shafts 16 and 18 are journaled to carry reels 20 and 22, which are retained in position upon said shafts by the usual pivoted elements 24 and 26, respectively. The driving shaft 16 is provided at one end with a fixedly-mounted sheave 28, which is driven by an electric motor 30 through the intermediacy of an endless belt 32.

The frame 14 is provided with bearings 38 for a vertically-disposed shaft 40, which extends downwardly into a yoke 42 provided with an anti-friction step-bearing 44 in which the lower end of said shaft 40 is mounted. The rear end of the reel shaft 18 is provided with a relatively large fixedly mounted bevel wheel 46, which intermeshes with two diametrically opposed smaller bevel wheels 48 and 50 loosely mounted upon the shaft 40 and provided with clutch members 52 and 54, respectively, for automatic engagement with the adjacent ends of a clutch member 56 slidably mounted upon the shaft 40 and caused to rotate therewith through the intermediacy of a feather 58. The clutch member 56 is shifted longitudinally into engagement with either clutch member 52 or 54 through the intermediacy of a lever 60, fulcrumed on a pivot 62 by the frame 14, which has a notched sector 64 to receive one end of a latch 66 mounted on the lever 60 to secure the same in any of its adjusted positions.

The intermediate portion of the vertical shaft 40 is provided with a loosely-mounted governor wheel 68 having a depending hub 70 bearing at its reduced lower end upon a collar 71 resting upon the bearing 44. The hub 70 is provided with a disk of insulation 72 encircled by a pair of fixedly mounted contact rings 74 and 76, against which a pair of brushes 78 and 80 are pressed by springs 82 and 84 mounted in tubular housings 86 and 88, respectively, at opposite sides of the yoke 42. The housings 86 and 88 are lined with tubular insulation into which binding screws 94 and 96 are threaded to bear against the adjacent ends of the springs 82 and 84, respectively, to hold them under compression and cause them to force the brushes 78 and 80 against the respective contact rings.

The lower side of the governor wheel 68 is provided with a disk of insulation 98 having a pair of depending switch points 100 and 102, electrically connected by a wire conductor 103 and adapted to be engaged by switch elements 104 and 105, respectively, carried on a nut 106 embracing a screw thread 108 integral with the shaft 40. As shown on Fig. 3, the nut 106 is insulated from the switch points 104 and 105, so that current cannot flow through said nut.

The switch point 104 is electrically connected to the contact ring 74 through the intermediacy of a flexible conductor 110, and the switch point 105 is electrically connected to the contact ring 76 through a flexible conductor 111 and a conductor 114, which latter extends down through the disk 72 to said contact ring 76.

The governor wheel 68 is driven by the shaft 40 through a resilient connection, such as a coil spring 116 and its hub 70 has a slot 115 in which the nut 106 is free to be moved vertically on the shaft 40 by the thread 108. The sides of the slot 115 cause the nut 106 to revolve with the governor wheel 68 and hold the switch points 104 and 105 in position to engage the switch points 100 and 102, respectively, when the nut 106 is carried upwardly on the shaft 40 by the thread 108. The spring 116 affords a yieldable connection between the shaft 40 and the governor wheel 68, so that the latter can travel slower or faster than the former momentarily and effect the closing and opening of the switch points 100 and 104, and 102 and 105, respectively, through the intermediacy of the nut 106 and the screw thread 108.

The reel shaft 18 is provided with a fixedly mounted brake wheel 118 embraced by a friction band 120 connected at its ends to a lever 122, fulcrumed upon a pin 124 projecting from the adjacent portion of the frame 14. The upper bifurcated end of the lever 122 straddles a sleeve 125 slidably mounted in lugs 126 projecting from the bracket 10. The sleeve 125 is provided with diametrically opposed studs 128 engaging one side of the forked end of the lever 122. A coil spring 130, is interposed between the opposite side of said lever 122 and the adjacent lug 126 to normally hold the brake-band 120 in frictional engagement with the brake wheel 118 to prevent the same and the shaft 18 from rotating.

The sleeve 125 is provided at its under portion with a notch 132 to receive the upper end of a brass latch 134, extending loosely through an electromagnet 136 and provided at its lower end with an armature 140. A retractile spring 142 secured to the electromagnet 136 and the latch 134 normally holds the latter out of the notch 132.

The sleeve 125 loosely embraces a rod 144 provided at its forward end with insulation 146, adapted to engage a contact 148 and force the same into engagement with the companion contact 150 of a circuit breaker 152. The rod 144 is normally held in forward position by a spring 154, to hold the insulation 146 out of engagement with the contact 148. The spring 154 is interposed between a collar 155, fixed on the rod 144, and an arm 157 secured to the adjacent lug 126. The contacts 148 and 150 are secured to a block of fiber or other insulation 156, secured to the bracket 10 and constituting a guide for the latch 134. The rod 144 is drawn backwardly to close the circuit breaker 152, by a cable 158 running over guide sheaves 160 and provided with a handle 162.

When the rod 144 is pulled backwardly, a collar 164 secured to said rod is carried backwardly against the adjacent end of the sleeve 5, and moves the same backwardly until the notch 132 is in position to be engaged by the latch 134.

The motor 30 and the governor wheel 96 with associated mechanism are inclosed in a case 200.

As disclosed on the diagram Fig. 7, one side of the motor 30 is connected to a main 166 through a wire conductor 168, while the opposite side of said motor is connected to one pole of the electromagnet 136. A wire 172 leads from the opposite pole of the electromagnet 136 to the contact 148 of the circuit breaker 152, the opposite contact 150 of which is connected to a wire 176, leading to the other main 180. Branch wires 182 and 184 lead from the wires 172 and 176 to the binding posts 96 and 94, respectively.

The operation is substantially as follows: The reel 22 containing the film F is placed in the magazine 6 upon the shaft 18, while the reel 20 is placed upon the shaft 16, after which the free end of the film F is attached to the hub of said reel 20 in the usual manner. The motor 30 is then started to drive the shaft 16 and cause the reel 20 to wind the film F thereon, by pulling on the handle 162 to draw the rod 144 backwardly until the insulation 146 engages and forces the contact 148 into engagement with the companion contact 150 of the circuit breaker 152. When the circuit closer 152 is thus closed current flows from the main wire 166 through the wire 168, the motor 30, the wire 170, the electromagnet 136, the wire 172, the circuit breaker 152, and returns through the wire 176, to the main wire 180. The circuit thus established starts the motor 30 and energizes the electromagnet 136, causing it to raise the armature 140 and the latch 134 against the action of the spring 142. As the latch 134 moves upwardly, it enters the notch 132, which is moved into position to receive the end of said latch 134 when the sleeve 125 is drawn backwardly against the action of the spring 130 through the intermediacy of the collar 164, secured to the rod 144. As the sleeve 125 is moved backwardly by the collar 164, it, through the intermediacy of the studs 128 actuates the lever 122, causing it to release the brake band 120 from the brake wheel 118, so that the shaft 18 may be driven by the reel 20 with which it has the usual groove-and-feather connection B. As the shaft 18 rotates it drives the large bevel gear 46, which in turn rotates the small bevel gears 48, and 50. With the film F running from the reel 22 to the reel 20 in the direction indicated by dotted arrows Fig. 1, the lever 60 is shifted to throw the clutch member 56 into engagement with the clutch member 54 of the small bevel gear 50, which drives the shaft 40 in proper direction to cause the thread 108 to raise the nut 106 until the switch points 104 and 105 engage the switch points 100 and 102, respectively. When the switch points are thus closed, the circuit is cut out from the circuit breaker 152 and established through the wire 182, the brush 80, the contact ring 74, the flexible connection 110, the switch points 104 and 100, the wire 103, the switch points 102 and 105, the flexible connection 111, the contact ring 76, the brush 78, and the wire 184. Only a short time elapses between the pulling of the handle 162 and the establishment of the last-mentioned circuit, and after such establishment the handle 162 is released to permit the spring 154 to push the rod 144 forwardly and allow the circuit breaker 152 to open. The last-mentioned circuit remains established until the film F is unwound from the reel 22, whereupon the latter begins to slow down, with the shafts 18 and 40 and the bevel gears 46, 48 and 50, until the speed of the thread 108 is less than that of the governor wheel 68 and the nut 106. This differential in speed causes the thread 108 to carry the nut 106 downwardly until the switch points 104 and 105 are disengaged from the companion switch points 100 and 102, respectively. The instant the circuit is thus interrupted by the opening of the switch points, current to the motor 30 and the electromagnet 136 is cut off. This results in stopping the motor 30 and deënergizing the electromagnet 36, so that the latter no longer attracts the armature 140. The retractile spring 142 then throws the latch 134 downwardly out of the notch 132 and permits the spring 130 to push the sleeve 125 forwardly to the position disclosed on Fig. 4, through the intermediacy of the lever 122 and the studs 128. As the lever 122 is thus actuated by the spring 130 it contracts the band 120 around the brake wheel 118 and thus checks the reel 20 through the intermediacy of the shaft 18.

Should the film F break while being wound upon the reel 20, the reel 22 slows down and effects the stopping of the motor 30 in the same manner as when said film F is fully unwound from the reel 22.

Having thus described my invention, what I claim and desire to secure by Letters Patent, is:

1. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, manually controlled means to initially close said circuit, a switch to maintain said circuit in closed position, rotary members actuated by the driven shaft and carrying the switch points, and means for moving one of said rotary members toward and away from its companion to close and open the switch.

2. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, manually controlled means to initially close said circuit, a switch to maintain said circuit in closed position, rotary members actuated by the driven shaft and carrying the switch points, and threaded means for moving one of said rotary members toward and away from its companion to close and open the switch.

3. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, manually controlled means to initially close said circuit, a switch to maintain said circuit in closed position, rotary members actuated by the driven shaft and carrying the switch points, yieldable means to permit said rotary members to lag behind the driven shaft in starting up and to momentarily travel faster than said shaft when slowing down, and threaded means for moving one of said rotary members toward and away from its companion to close and open the switch.

4. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, manually controlled means to initially close said circuit, a switch to maintain said circuit in closed position, a governor carrying certain of the switch points, a nut driven by said governor and carrying the opposing switch points, a threaded element actuated by the driven shaft to drive the governor and move the nut toward and away from said governor to close and open the switch points, and yieldable means to permit the governor to lag behind said threaded element in starting up and to momentarily travel faster than said threaded element when slowing down.

5. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, manually controlled means to initially close said circuit, a switch to maintain said circuit in closed position, a governor carrying certain of the switch points, a nut driven by said governor and carrying the opposing switch points, a threaded element actuated by the driven shaft to drive the governor and move the nut toward and away from said governor to close and open the switch points, yieldable means to permit the governor to lag behind said threaded element in starting up and to momentarily travel faster than said threaded element when slowing down, a conductor connecting the switch points on the governor, flexible conductor means connected to the switch points carried by the nut, a contact ring for each flexible conductor means, and brushes bearing on said contact rings and connected to opposite sides of the motor circuit.

6. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, manually controlled means to initially close said circuit, a switch to maintain said circuit in closed position, a relatively large bevel gear fixed to the driven shaft, two smaller bevel gears driven by said large bevel gear and provided with clutch members, a third shaft upon which said smaller bevel gears are loosely mounted, a clutch member having a groove-and-feather connection with said third shaft and adapted to be shifted into engagement with either of the clutch members on smaller bevel gears, rotary members actuated by the third shaft and carrying the switch points, and means on the third shaft for moving one of said rotary members toward and away from its companion to close and open the switch.

7. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, a circuit breaker, brake mechanism for normally holding the driven shaft stationary, manually controlled means to close said circuit breaker to effect the initial closing of the motor circuit and release the brake mechanism so that the driven shaft may rotate, and electrically controlled means to hold the brake mechanism in released position until the motor circuit is opened.

8. In an apparatus of the character described, the combination of an electric motor, a driving shaft actuated by said motor and adapted to carry a film receiving reel, a driven shaft adapted to carry a reel with a film and be driven by said film from said driving shaft, a circuit for the motor, a circuit breaker to normally hold said circuit open, brake mechanism for normally holding the driven shaft stationary, manually controlled means to close said circuit breaker to effect the initial closing of the motor circuit, a latch to secure said manually controlled means in position to hold the brake mechanism in released position, an armature secured to said latch, an electromagnet arranged in the motor circuit to attract said armature and hold the latch in active position, resilient means to withdraw the latch from the manually controlled means when the electromagnet is deënergized by opening the motor circuit, and means to automatically restore the manually controlled means to inactive position and the brake mechanism to active position.

In testimony whereof I affix my signature in the presence of two witnesses.

EARL H. FRANCIS.

Witnesses:
F. G. FISCHER,
L. J. FISCHER.